(12) United States Patent
Huang (10) Patent No.: US 9,730,263 B2
(45) Date of Patent: Aug. 8, 2017

(54) SERVICE RECOVERY METHOD, APPARATUS, AND SYSTEM FOR A WIRELESS COMMUNICATION NETWORK (75) Inventor: Ying Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1438 days.

(21) Appl. No.: 13/282,988

(22) Filed: Oct. 27, 2011

(65) Prior Publication Data

US 2012/0077509 A1 Mar. 29, 2012

Related U.S. Application Data

(63) Continuation of application No. PCT/CN2009/071479, filed on Apr. 27, 2009.

(51) Int. Cl.
*H04W 76/02* (2009.01)
*H04W 36/30* (2009.01)

(52) U.S. Cl.
CPC .......... *H04W 76/028* (2013.01); *H04W 36/30* (2013.01)

(58) Field of Classification Search
CPC .................................................... H04W 76/028
See application file for complete search history.

(56) References Cited

U.S. PATENT DOCUMENTS

| | | | |
|---|---|---|---|
| 2009/0046573 A1 | 2/2009 | Damnjanovic | |
| 2009/0047954 A1 | 2/2009 | Tenny et al. | |
| 2009/0061878 A1* | 3/2009 | Fischer | G08C 17/02 455/436 |
| 2009/0258631 A1* | 10/2009 | Forsberg et al. | 455/411 |
| 2011/0021194 A1* | 1/2011 | Gustafsson et al. | 455/435.1 |
| 2011/0222511 A1 | 9/2011 | Weng et al. | |

FOREIGN PATENT DOCUMENTS

| | | |
|---|---|---|
| CN | 1536795 A | 10/2004 |
| CN | 101127588 A | 2/2008 |
| CN | 101175307 A | 5/2008 |
| CN | 101370228 A | 2/2009 |
| CN | 201204698 Y | 3/2009 |
| CN | 101400088 A | 4/2009 |
| CN | 101742576 A | 6/2010 |
| EP | 1796404 A1 | 6/2007 |

(Continued)

OTHER PUBLICATIONS

3GPP TSG-RAN WG1 #56bis Seoul, South Korea Mar. 23-27, 2009 Further Evaluation of mobility performance in LTE.*

(Continued)

*Primary Examiner* — Christopher M Brandt
(74) *Attorney, Agent, or Firm* — Slater Matsil, LLP (57) ABSTRACT

A service recovery method for a wireless communication network is disclosed. The method includes: receiving a radio resource control (RRC) re-establishment request or a cell update message from a user equipment (UE); performing an RRC establishment process that is triggered by a non-access-stratum of the UE if the RRC re-establishment or the cell update fails; and sending an initial UE message to a core network device after the RRC establishment process is complete. In the embodiments of the present invention, service continuity of the UE in an active state is ensured.

11 Claims, 9 Drawing Sheets

(56) References Cited

FOREIGN PATENT DOCUMENTS

| EP | 2341665 A1 | 7/2011 |
|---|---|---|
| EP | 2 373 113 A1 | 10/2011 |
| EP | 2 418 910 A1 | 2/2012 |
| WO | WO 2007/110746 A3 | 10/2007 |
| WO | WO 2008/086460 A2 | 7/2008 |

OTHER PUBLICATIONS

Evolved Universal Terrestrial Radio Access Network (E-UTRAN); X2 Application Protocol (X2AP) (3GPP TS 36.423 version 8.5.0 Release 8) (available on Mar. 17, 2009).*
NEC, "Radio Link Failure recovery on non prepared eNB," 3GPP TSG-RAN WG2#61, Tdoc R2-081170, Sorrento, Italy, Feb. 11-15, 2008, 8 pages.
Chinese Search Report received in Application No. 2009801221371, mailed Mar. 19, 2013.
First Office Action of Chinese Application No. 200980122137.1, mailed Apr. 2, 2013, 9 pages. (Partial Translation).
EPO Extended European Search Report mailed Jul. 19, 2012, issued in related European Application No. 09843842.7, Huawei Technologies Co., Ltd. (15 pages).
3GPP TS 36.413 V8.5.1 (Mar. 2009), $3^{rd}$ Generation Partnership Project; Technical Specification Group Radio Access Network; Evolved Universal Terrestrial Radio Access Network (E-UTRAN); S1 Application Protocol (S1AP), Release 8 (215 pages).
3GPP TSG CT WG1 Meeting #57, San Antonio, TX, Feb. 9-19, 2009, C1-090062 "Reply LS to C1-084495=R2-086018, S2-087325=R2-086054, R3-082850=R2-086034 on Connectivity Recovery by NAS", RAN WG2, (3 pages).
3GPP TSG-RAN WG2#61, Sorrento, Italy, Feb. 11-15, 2008, Tdoc R2-081170, "Radio Link Failure Recovery on Non Prepared eNB", NEC, (8 pages).
3rd Generation Partnership Project; Technical Specification Group Radio Access Network; RRC Protocol Specification (Release 1999), 3G TS 25.331, V3.3.0, Jun. 2000, 5 pages.
Written Opinion of the International Searching Authority (translation) dated (mailed) Feb. 4, 2010, issued in related Application No. PCT/CN2009/071479, filed Apr. 27, 2009, Huawei Technologies Co., Ltd.
International Search Report for International Application No. PCT/CN2009/071479, mailed Feb. 4, 2010 Huawei Technologies Co., Ltd.
$3^{rd}$ Generation Partnership Project; Technical Specification Group Radio Access Network; E-UTRAN Mobility Evaluation and Enhancement; (Release 9), 3GPP TR ab.cde Vx.y.z, Mar. 17, 2009, 10 pages.
Extended European Search Report received in Application No. 13154424.9-1857, Applicant: Huawei Technologies Co., Ltd., Mar. 1, 2013, 9 pages.

* cited by examiner

SERVICE RECOVERY METHOD, APPARATUS, AND SYSTEM FOR A WIRELESS COMMUNICATION NETWORK

This application is a continuation of International Application No. PCT/CN2009/071479, filed Apr. 27, 2009, which is hereby incorporated by reference in its entirety.

FIELD OF THE INVENTION

The present invention relates to wireless communications technologies, and in particular, to a service recovery method, apparatus, and system for a wireless communication network.

BACKGROUND OF THE INVENTION

During running of a mobile network, a cell may suddenly encounter a fault or a power failure. In this case, the cell cannot work properly, and a service of a user equipment (UE) in an active state is interrupted. When the cell suddenly encounters a fault and fails to work properly, the UE detects a Radio Link Failure (RLF), reselects a new cell, and then initiates a link re-establishment process of a radio link.

In implementation of the present invention, the inventor finds that, in the prior art, when the cell encounters a fault, after the UE selects a new cell, no technical scheme about how an access network device in the new cell establishes a connection with a core network is provided, and therefore service continuity of the UE in the active state cannot be guaranteed.

SUMMARY OF THE INVENTION

An embodiment of the present invention provides a service recovery method for a wireless communication network. The method includes: receiving a radio resource control (RRC) re-establishment request or a cell update message from a UE; performing an RRC establishment process that is triggered by a non-access-stratum (NAS) of the UE if the RRC re-establishment or the cell update fails; and sending an initial UE message to a core network device after the RRC establishment process is complete.

Another embodiment of the present invention provides a service recovery method for a wireless communication network. The method includes: receiving an RRC re-establishment request or a cell update message from a UE; and sending a notification message to a source evolved NodeB (eNB) to request the source eNB to initiate a switching preparation process of an X2 and/or S1 interface if context information of the UE cannot be obtained.

Another embodiment of the present invention provides a service recovery method for a wireless communication network. The method includes: receiving an RRC re-establishment request or a cell update message from a UE; obtaining context information of the UE; and sending a notification message to a core network device to request for establishing a connection with the core network device.

Another embodiment of the present invention provides a service recovery apparatus for a wireless communication network. The apparatus includes: a receiving unit, configured to receive an RRC re-establishment request or a cell update message from a UE; an RRC establishing unit, configured to perform an RRC establishment process that is initiated by an NAS of the UE when the RRC re-establishment or the cell update fails; and a processing unit, configured to send an initial UE message to a core network device when the RRC establishment process is complete.

Another embodiment of the present invention provides a service recovery apparatus for a wireless communication network. The apparatus includes: a receiving unit, configured to receive an RRC re-establishment request or a cell update message from a UE; and a notifying unit, configured to send a notification message to a source access network device to request the source access network device to initiate a switching preparation process of an X2 and/or S1 interface when context information of the UE cannot be obtained.

Another embodiment of the present invention provides a service recovery apparatus for a wireless communication network. The apparatus includes: a receiving unit, configured to receive an RRC re-establishment request or a cell update message from a UE, where the RRC re-establishment request or the cell update message contains context information and/or an identifier of the UE; an obtaining unit, configured to obtain the context information of the UE; and a sending unit, configured to send a notification message to a core network device to request for establishing a connection with the core network device.

Another embodiment of the present invention provides a service recovery system for a wireless communication network. The system includes a core network device and the service recovery apparatuses for the wireless communication network as provided in the preceding.

The preceding technical solutions provided in embodiments of the present invention target a process of establishing a connection between the access network device serving a new cell and the core network device during reselection of a UE to the new cell for service recovery when a cell cannot work properly in the case of an emergent fault, thereby ensuring service continuity of the UE in the active state.

BRIEF DESCRIPTION OF THE DRAWINGS

To better illustrate technical solutions in embodiments of the present invention or in the prior art, the following briefly describes the accompanying drawings that need to be used in descriptions about the embodiments. It is apparent that the accompanying drawings merely provide some embodiments of the present invention. Those skilled in the art may obtain other accompanying drawings based on these accompanying drawings without creative efforts.

DETAILED DESCRIPTION OF THE EMBODIMENTS

The technical solutions in the embodiments of the present invention are elaborated below with reference to the accompanying drawings. Evidently, the embodiments described below are for an exemplary purpose only, without covering all embodiments of the present invention. Those skilled in the art may derive other embodiments from the embodiments given herein without making any creative effort, and all such embodiments are covered in the protection scope of the present invention.

Figure 1:
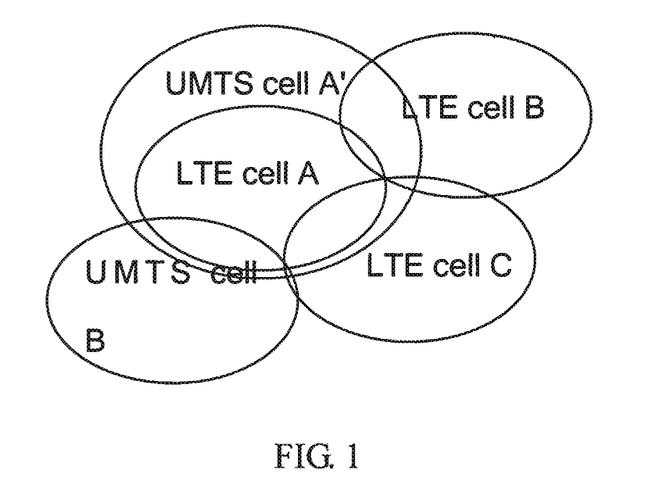
FIG. 1 is a schematic diagram of coverage of cells within different systems.

In a mobile communication system, to ensure service continuity or solve a coverage problem, cells within different systems or at different frequencies may generally cover the same area. As shown in FIG. 1, cell A in an LTE system and cell A' in a UMTS system cover the same area.

Figure 2:
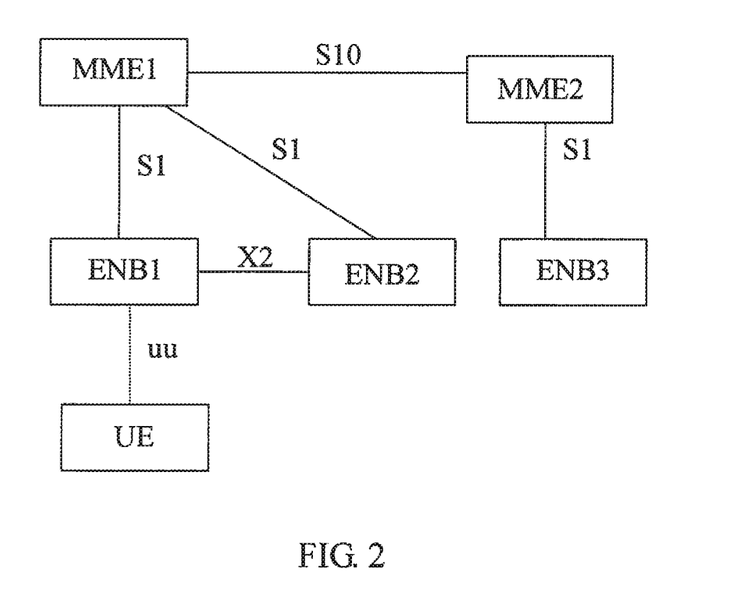
FIG. 2 is a schematic structural diagram of a Long Term Evolution (LTE) system.

FIG. 2 shows a network structure of an LTE system. An interface between a core network device Mobility Management Entity (MME) and an eNB is an S1 interface. An interface between different MMEs is an S10 interface. An interface between different eNBs is an X2 interface. An interface between an eNB and a UE is a Uu interface. The Uu interface uses an RRC message for communication.

Figure 3:
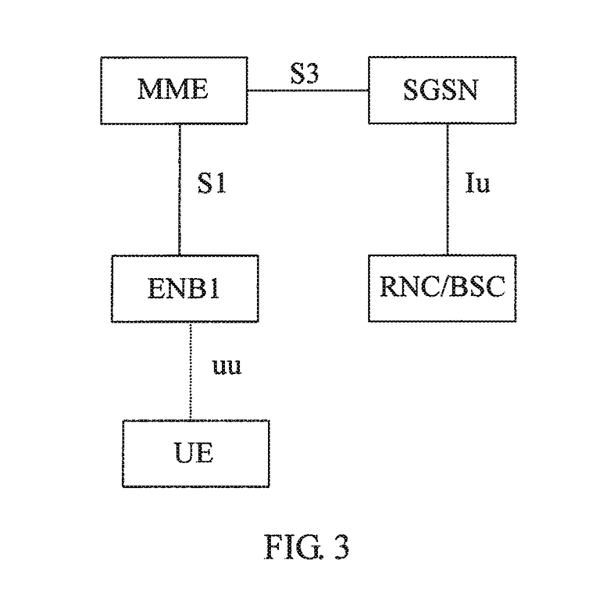
FIG. 3 is a schematic diagram of a structure between an LTE system and a Universal Mobile Telecommunications System (UMTS) or a Global System for Mobile communication (GSM) system.

FIG. 3 shows a connection between an LTE system and a UMTS/GSM system. An interface between an access network device Radio Network Controller (RNC) or Base Station Controller (BSC) and a core network device Serving GPRS Support Node (SGSN) is an Iu or A interface. An interface between an MME and an SGSN is an S3 interface.

The embodiments of the present invention provide a process of establishing a connection between an access network device serving a new cell and a core network device when a cell in the LTE system is faulty and a UE reselects the new cell, where the new cell may be a cell in the LTE system or a cell within a different system, such as a UMTS cell or a GSM cell.

Embodiment 1

Figure 4:
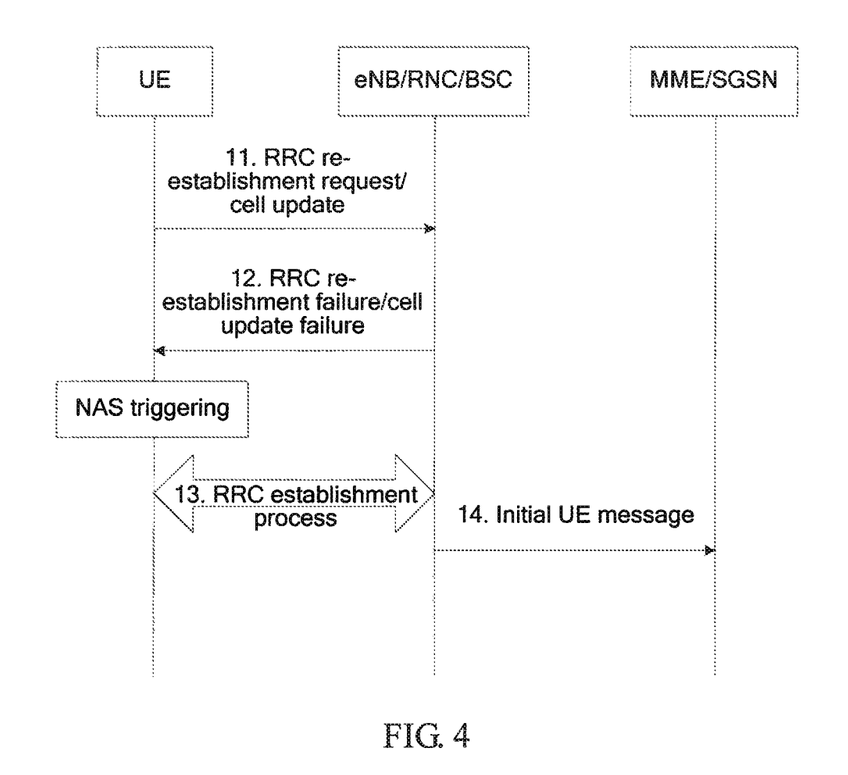
FIG. 4 is a schematic diagram of a service recovery process according to a first embodiment of the present invention.

This embodiment provides a service recovery method for a wireless communication network, as shown in FIG. 4. This method includes:

Step 11: An access network device serving a new cell receives an RRC re-establishment request or a cell update message from a UE.

When detecting an RLF, the UE reselects a new cell, and sends the RRC re-establishment request to an eNB serving the new cell. This new cell may be an LIE cell, a UMTS cell, or a GSM cell. The access network device in the LTE cell is an eNB. The access network device of the UMTS or GSM cell is an RNC or a BSC. When the new cell is the LTE cell, the UE sends the RRC re-establishment request. When the new cell is a UMTS or GSM cell, the UE sends the RRC re-establishment request or the cell update message.

Step 12: If the access network device in the new cell does not find context information of the UE, send a corresponding RRC re-establishment failure message or a cell update failure message, or do not send any message to the UE.

Step 13: Perform an RRC establishment process that is triggered by an NAS, where the RRC establishment process is triggered by the NAS of the UE. If the UE receives a failure message or does not receive any message within a set period, the NAS triggers a link connection with the new cell. Alternatively, in the RRC establishment process, an RRC message from the UE may carry an indication or a cause value, where the indication or the cause value is configured to indicate that the RRC establishment process is a link recovery process triggered by the NAS.

Step 14: Send an initial UE message to a core network device after the RRC establishment process is complete. For the LTE cell, this core network device is an MME. For the UMTS or GSM cell, this core network device is an SGSN.

In this embodiment, a connection between the eNB serving the new cell and the core network device is established through the initial UE message, thereby ensuring service continuity of the UE in an active state.

Embodiment 2

Figure 5:
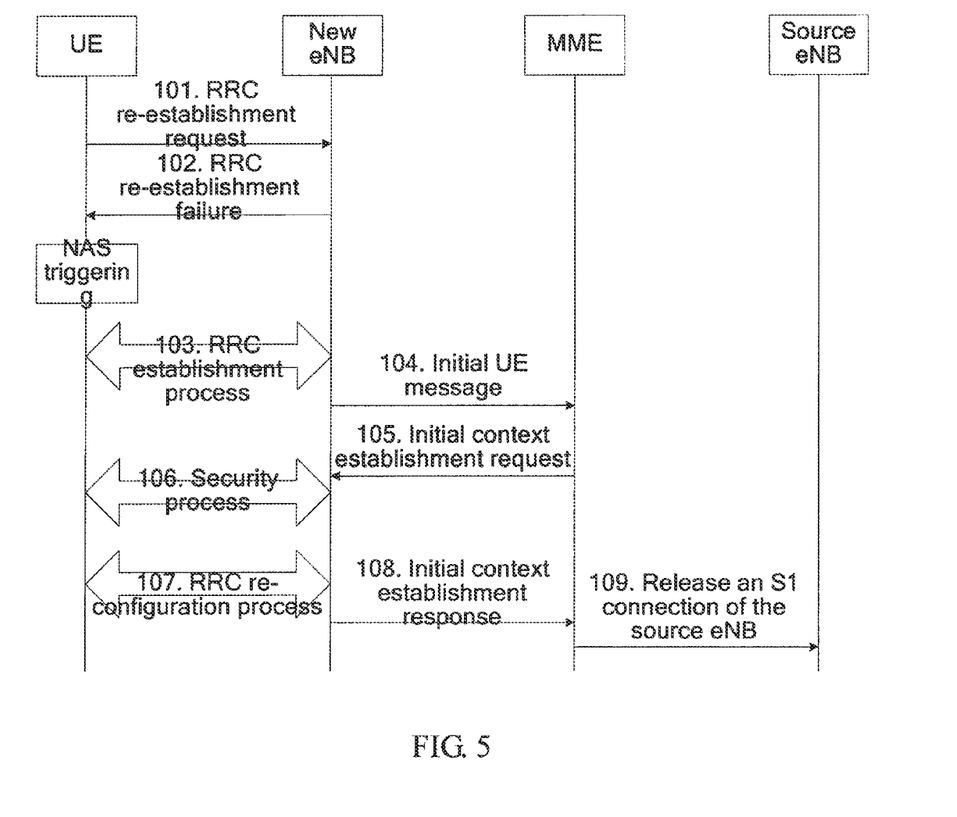
FIG. 5 is a schematic diagram of a first service recovery process according to a second embodiment of the present invention.

This embodiment provides a service recovery method for a wireless communication network. In this embodiment, when a new cell reselected by a UE is a cell in an LTE system, an access network device in the new cell in this embodiment is an eNB serving the new cell, that is, a new eNB. As shown in FIG. 5, the method includes:

Step 101: When detecting an RLF, a UE reselects a new cell and sends an RRC re-establishment request to an eNB (a new eNB) in the new cell.

Step 102: After receiving the RRC re-establishment request, the new eNB sends an RRC re-establishment failure message if UE context is not found.

Step 103: An NAS of the UE triggers an RRC establishment process. After the triggering performed by the NAS, the new eNB and the UE perform the RRC establishment process. Alternatively, in the RRC establishment process, an RRC message from the UE may carry an indication or a cause value, where the indication or the cause value is configured to indicate that the RRC establishment process is a link recovery process triggered by the NAS.

Step 104: After RRC establishment is complete, the new eNB sends an initial UE message to an MME to trigger establishment of an S1 interface. For example, after receiving an RRC establishment complete message from the UE, the new eNB sends the initial UE message to the MME to trigger establishment of the S1 interface. This step implements a connection between the eNB and the MME through the initial UE message.

Step 105: The new eNB receives an initial context establishment request from the MME.

Step 106: A security authentication process is performed between the UE and the new eNB. In this process, the new eNB may obtain context information of the UE. This step is optional.

Step 107: The new eNB and the UE perform RRC re-configuration.

Step 108: The new eNB sends an initial context establishment response to the MME.

Steps 105 to 108 are the same as those in an existing normal service request process.

Alternatively, step 109, in which the MME sends an S1 interface release command to a source eNB to instruct the source eNB to release the S1 interface, may be included after step 108. Many methods exist for releasing the S1 interface of the source eNB. Releasing the S1 interface according to the S1 interface release command is only one of the methods. Therefore, the present invention is not confined to this method, for example, the S1 interface between the MME and the source eNB may also be released in a timing manner by triggering a timer.

In another embodiment of the present invention, if the MME connected to the eNB serving the new cell is changed, that is, a new MME connected to the new eNB is not a source MME connected to the source eNB, the two MMEs transfer a message through an S10 interface. That is, the new MME sends a message of instructing the source eNB to release the S1 interface to the source MME through the S10 interface, and then the source MME instructs the source eNB to release the S1 interface.

In the preceding embodiment, the new eNB completes establishment of the S1 interface by initiating an originating service process, for example, the initial UE message.

Figure 6:
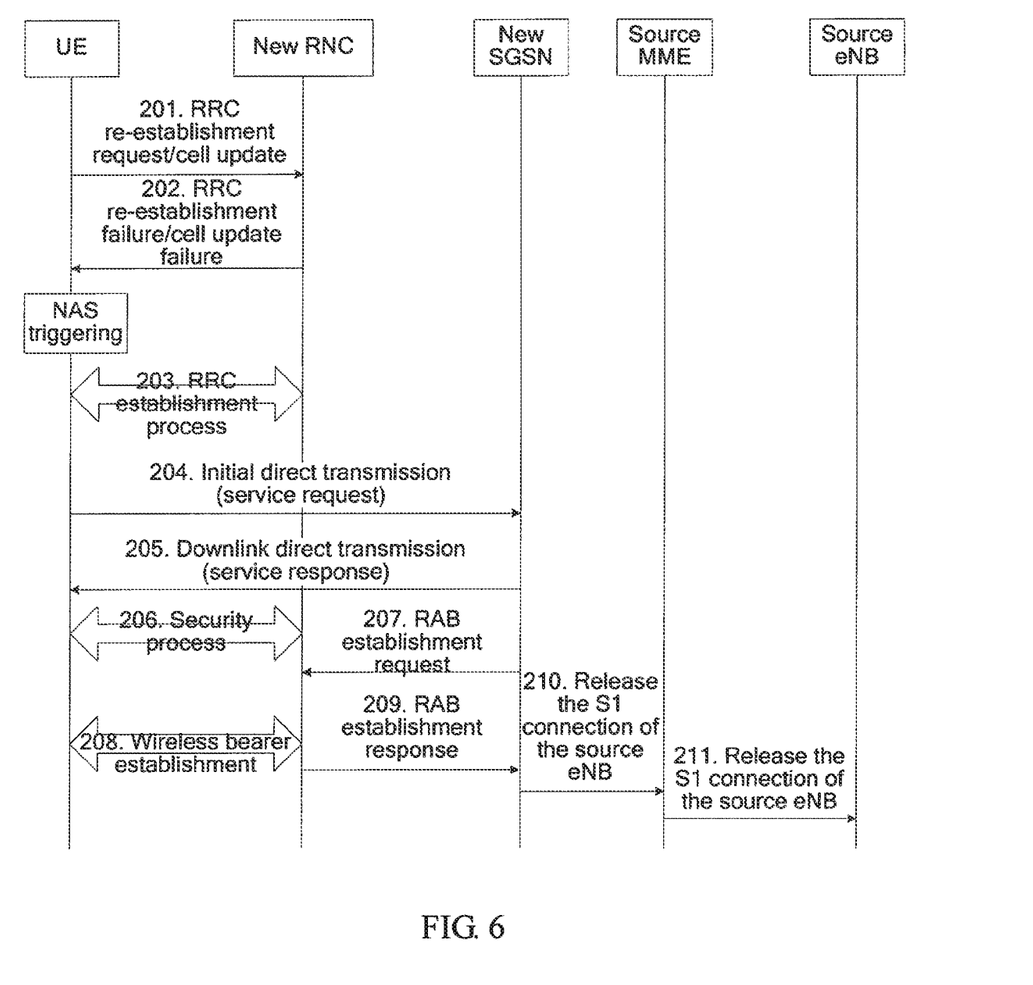
FIG. 6 is a schematic diagram of a second service recovery process according to the second embodiment of the present invention.

In another embodiment of the present invention, if the new cell is a UMTS or GSM cell, an access network device RNC or BSC in the UMTS or GSM cell corresponds to the new eNB in the preceding embodiment, an Iu or A interface corresponds to the S1 interface in the preceding embodiment, and an SGSN corresponds to the new MME. In this case, the RNC or BSC may send an initial UE message of the Iu or A interface to establish the Iu or A interface. As shown in FIG. 6, taking that the new cell is a UMTS cell as an example, the service recovery method in this embodiment includes the following steps:

Step 201: When detecting an RLF, the UE reselects a new cell and sends an RRC re-establishment request or a cell update message to an RNC (a new RNC) of the new cell. Alternatively, a timer may be started at the same time.

Step 202: After receiving the RRC re-establishment request or the cell update message, the RNC sends an RRC re-establishment failure message or a cell update failure message, or does not send any message if the RNC does not find UE context.

Step 203: An NAS of the UE triggers an RRC establishment process. After the UE receives the failure message or does not receive any message after the timer expires, the NAS triggers link establishment with the new cell, and the new RNC and the UE perform the RRC establishment process. Alternatively, in the RRC establishment process, an RRC message from the UE may carry an indication or a cause value, where the indication or the cause value is configured to indicate that the RRC establishment process is a link recovery process triggered by the NAS.

Step 204: After RRC establishment is complete, the new RNC sends an initial UE message to a new SGSN to trigger establishment of an Iu interface. For example, after the new RNC receives an RRC establishment complete message, the UE sends an initial direct transmission message to submit a service request; the new RNC sends the initial UE message to the new SGSN through the Iu interface to trigger establishment of the Iu interface.

Step 205: The new SGSN sends a downlink direct transmission message to the UE, and the new RNC forwards this message that is used as a response to the service request.

Step 206: The new RNC and the UE perform a security authentication process. This step is optional.

Step 207: The new SGSN sends a Radio Access Bearer (RAB) assigned request message to the new RNC.

Step 208: The new RNC and the UE establish an RAB.

Step 209: The new RNC sends an RAB assigned response message to the new SGSN.

Steps 204 to 209 are the same as those in the existing normal service request process.

Alternatively, after step 209, the method may further include:

Step 210: The new SGSN sends an S1 interface release command through an S3 interface to a source MME.

Step 211: The source MME sends the S1 interface release command to a source eNB.

In this embodiment, the RNC in the new cell completes establishment of the Iu interface with the core network device SGSN in the new cell through the initial UE message, thereby ensuring service continuity of the UE in the active state.

In a GSM system, similarly, the BSC completes establishment of the A interface with the SGSN through a first A interface message in a normal service establishment process.

Embodiment 3

Figure 7:
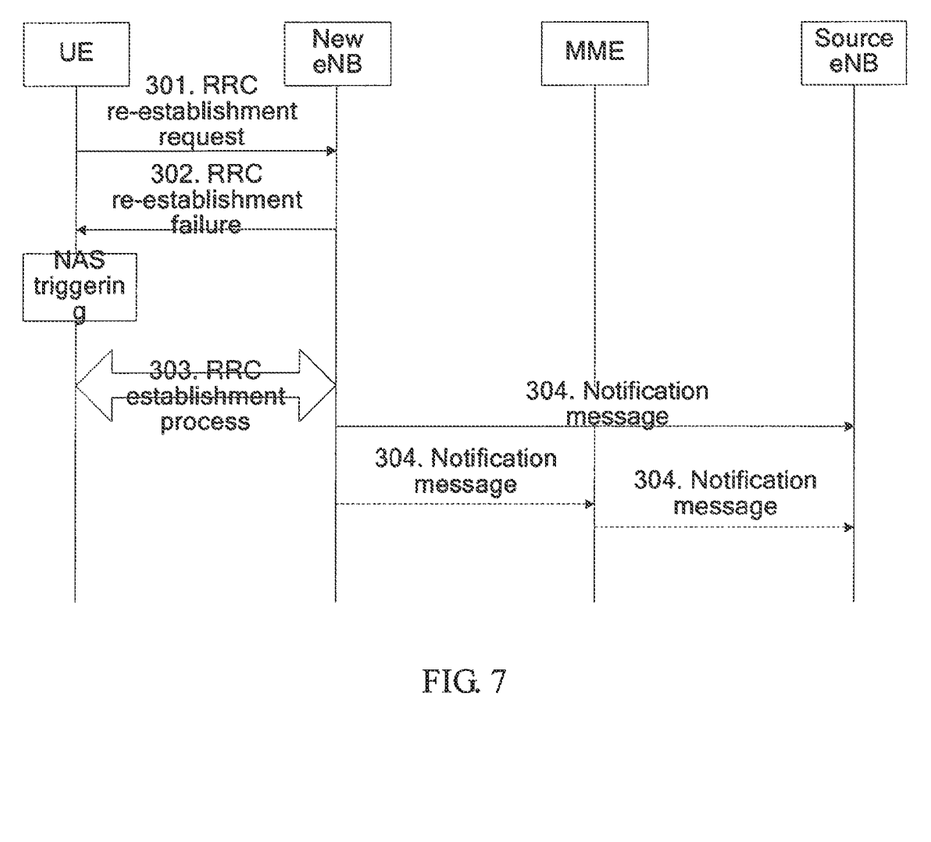
FIG. 7 is a schematic diagram of a service recovery process according to a third embodiment of the present invention.

This embodiment provides a service recovery method for a wireless communication network. In this embodiment, taking that a new cell is an LTE cell as an example, an access network device in the new cell in this embodiment is an eNB serving the new cell, that is, a new eNB. As shown in FIG. 7, this method includes:

Step 301: A UE finds an RLF, reselects a new cell, and sends an RRC re-establishment request to a new eNB.

Step 302: After receiving the RRC re-establishment request, the new eNB sends an RRC re-establishment failure message to the UE if UE context of the UE is not found.

Step 303: After the UE receives the RRC re-establishment failure message, an NAS triggers a process of establishing RRC with the new eNB. After the triggering performed by the NAS, the new eNB and the UE perform the RRC establishment process. Alternatively, in the RRC establishment process, an RRC message from the UE may carry an indication or a cause value, where the indication or the cause value is configured to indicate that the RRC establishment process is a link recovery process triggered by the NAS.

Step 304: The new eNB sends a notification message to a source eNB to request the source eNB to initiate a switching preparation process of an X2 interface and/or an S1 interface. The method of sending the notification message by the new eNB to the source eNB includes: directly sending the notification message to the source eNB through the X2 interface; or sending the notification message to an MME through the S1 interface, and forwarding, by the MME, the notification message to the source eNB. That is, the source eNB is instructed to initiate the switching preparation process of the X2 or S1 interface in a direct manner or in an indirect manner.

After receiving the notification message, the source eNB initiates the switching preparation process of the X2 or S1 interface. That is, after receiving the notification message from the X2 interface of the new eNB or from the S1 interface of the MME, the source eNB performs the switching preparation process of the X2 or S1 interface. After the switching preparation process is complete, an S1 interface connection between the eNB serving the new cell and a new MME is established. The switching preparation process of the X2 or S1 interface is implemented by using the prior art, and therefore is not described in this embodiment. Alternatively, before initiating the switching preparation process of the X2 or S1 interface, the source eNB may send a response message to the eNB serving the new cell.

In step 304 of this embodiment:

If the new eNB does not know a running status of the source eNB, and an X2 interface exists between the new eNB and the source eNB, a notification message is sent to the source eNB through the X2 interface, and a timer may be started at the same time. If the X2 interface of the new eNB does not receive a response message within a specified time period or receives a failure message, the new eNB sends a notification message to the MME through the S1 interface. The MME transfers this notification message to the source eNB through the S1 interface to request the source eNB to initiate the switching preparation process of the X2 and S1 interfaces.

If the MME connected to the eNB serving the new cell is different from that connected to the source eNB, that is, the new eNB is connected to a new MME, and the source eNB is connected to a source MME, the new eNB sends a notification message to the new MME through the S1 interface, the new MME transfers this notification message to the source MME through an S10 interface, and the source MME forwards this notification message to the source eNB to request the eNB to initiate the switching preparation process of the S1 interface.

If the new cell is a UMTS or GSM cell, the access network device in the new cell is an RNC or BSC that corresponds to the preceding eNB serving the new cell, the Iu or A interface corresponds to the preceding S1 interface, and a core network device SGSN in the new cell corresponds to the preceding new MME. The access network device RNC or BSC in the new cell sends a notification message of the Iu or A interface to the source eNB through the SGSN and the source MME to request the source eNB to perform the switching preparation process of the S1 interface. A message that is sent to the new cell after the UE detects an RLF may be an RRC re-establishment or a cell update message. Specifically, the RNC or BSC sends a notification message to the SGSN through the Iu or A interface. The SGSN sends the notification message to the source MME through an S3 interface. The source MME forwards the notification message to the source eNB through the S1 interface to instruct the source eNB to perform the switching preparation process of the S1 interface. After receiving the notification message, the source eNB performs the switching preparation process of the S1 interface to establish an Iu or A interface connection between the RNC or BSC serving the new cell and the SGSN. Alternatively, before performing the switching preparation process of the S1 interface, the source eNB may send a response message to the eNB serving the new cell.

In this embodiment of the present invention, the access network device in the new cell establishes a connection with the S1 interface of the core network device MME in the new cell by using the switching preparation process, or establishes a connection with the Iu or A interface of the SGSN, thereby ensuring service continuity of the UE in an active state.

Embodiment 4

Figure 8:
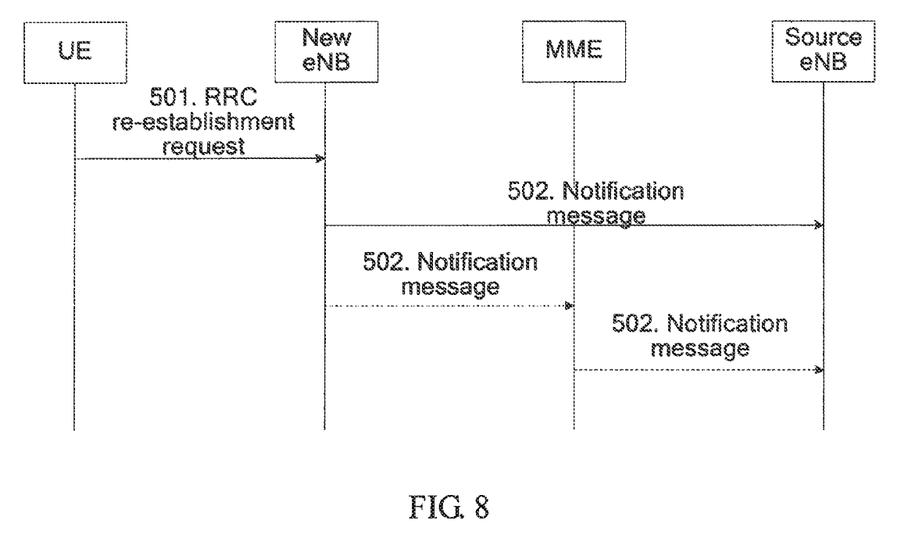
FIG. 8 is a schematic diagram of a service recovery process according to a fourth embodiment of the present invention.

This embodiment provides a service recovery method for a wireless communication network. In this embodiment, taking that a new cell is an LTE cell as an example, an access network device in the new cell in this embodiment is an eNB serving the new cell, that is, a new eNB. As shown in FIG. 8, this method includes:

Step 501: A UE finds an RLF, reselects a new cell, and sends an RRC re-establishment request to a new eNB.

Step 502: The new eNB receives the re-establishment request, does not find UE context of the UE, and sends a notification message to a source eNB or MME to request the source eNB to perform a switching preparation process of an X2 and/or S1 interface.

In this step, the sending the notification message to the source eNB or MME includes: directly sending the notification message to the source eNB through the X2 interface; or sending the notification message to the MME through the S1 interface, and forwarding, by the MME, the notification message to the source eNB. That is, the source eNB is instructed to initiate the switching preparation process of the X2 or S1 interface in a direct manner or in an indirect manner.

Before initiating the switching preparation process of the X2 or S1 interface upon receiving the notification message, the source eNB may send a response message to the eNB serving the new cell.

If the eNB (the new eNB) in the new cell does not know a running status of the eNB (the source eNB) in the source cell, and the X2 interface exists between the new eNB and the source eNB, as shown in FIG. 8, the notification message is sent through the X2 interface preferably, and a timer may be started at the same time. If the X2 interface does not receive a response message within a specified time period or receives a failure message, the new eNB sends a notification message to the MME through the S1 interface. The MME transfers this notification message to the source eNB through the S1 interface to request the source eNB to initiate the switching preparation process of the X2 and S1 interfaces.

If the MME connected to the eNB serving the new cell is different from that connected to the source eNB, that is, the new MME connected to the new eNB and the source MME connected to the source eNB are not the same entity, the new eNB sends a notification message to the new MME through the S1 interface, the new MME transfers this notification message to the source MME through an S10 interface, and the source MME forwards this notification message to the source eNB to request the eNB to initiate the switching preparation process of the S1 interface.

If the new cell is a UMTS or GSM cell, an access network device RNC or BSC in the new cell corresponds to the preceding eNB in the new cell, and an Lu or A interface corresponds to the preceding S1 interface. In this case, the RNC or BSC sends a notification message to an SGSN through the Iu or A interface. The SGSN sends the notification message to the MME through an S3 interface. The MME forwards the notification message to the source eNB through the S1 interface to request the source eNB to perform the switching preparation process of the S1 interface. Before the source eNB and the MME performs S1 interface switching, a notification response message may be sent to the RNC or BSC by being forwarded by the SGSN. A message that is sent to the new cell after the UE detects an RLF may be an RRC re-establishment message or a cell update message.

In this embodiment, the access network device (eNB, RNC, or BSC) in the new cell sends a notification message to the source eNB or the source MME to trigger establishment of a connection with the core network device, that is, the MME or the SGSN, in the new cell, thereby ensuring service continuity of the UE in an active state.

Embodiment 5

Figure 9:
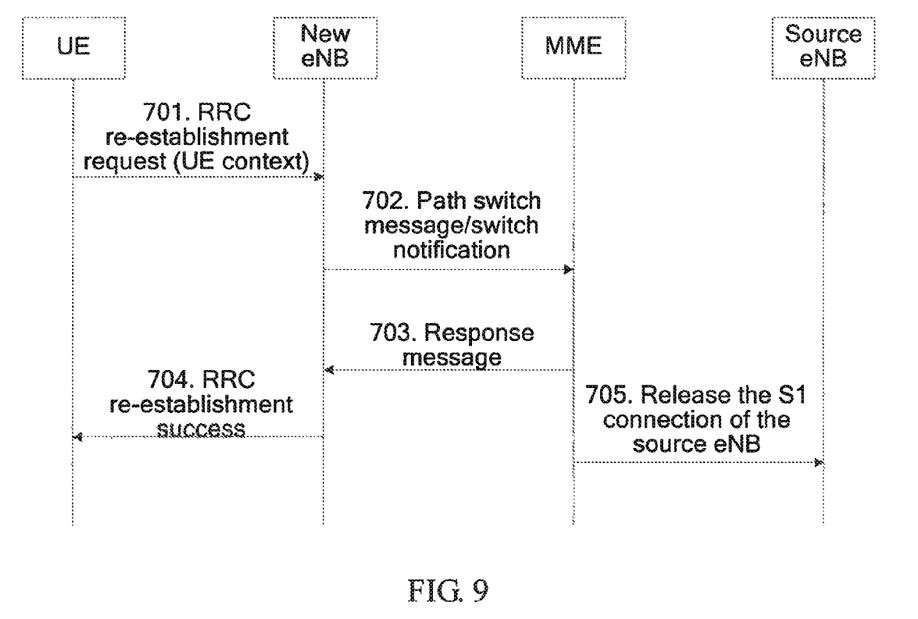
FIG. 9 is a schematic diagram of a service recovery process according to a fifth embodiment of the present invention.

This embodiment provides a service recovery method for a wireless communication network. In this embodiment, taking that a new cell is an LTE cell as an example, an access network device of the new cell is an eNB in the new cell, that is, a new eNB. As shown in FIG. 9, this method includes:

Step 701: A UE finds an RLF, reselects a new cell, and sends an RRC re-establishment request to an eNB (a new eNB) in the new cell, where this RRC re-establishment request carries UE context; the new eNB may obtain the UE context from this RRC re-establishment request; alternatively, the RRC re-establishment request may carry a UE identifier and/or S1 interface application identifiers (S1AP IDs) of a source MME and UE, where the UE identifier may be, for example, an SAE Temporary Mobile Station Identifier (S-TMSI) or an International Mobile Station Identifier (IMSI).

Step 702: The new eNB sends an S1 interface message, for example a path switch message, a handover notify message, or another S1 interface message, to an MME to request for establishing an S1 connection.

Step 703: The new eNB receives an S1 interface response message from the MME.

Step 704: Send an RRC re-establishment success message to the UE.

If the S1 interface response message fails to be received from the MME within a set time period in step 703, an RRC re-establishment failure message is sent to the UE in step 704.

Alternatively, after step 704, the method may further include:

Step 705: The MME sends an S1 interface release command to the source eNB to instruct the source eNB to release the S1 interface.

If the MME connected to the new eNB is different from that connected to the source eNB, that is, the new eNB is connected to a new MME, and the source eNB is connected to a source MME, the two MMEs transfer a message through an S10 interface. The new eNB sends a message of instructing the source eNB to release the S1 interface to the new MME through the S1 interface. The new MME forwards this message to the source MME through the S10 interface. Then, the source MME instructs the source eNB to release a connection of the S1 interface.

If the new cell is a UMTS or GSM cell, an access network device RNC or BSC in the new cell corresponds to the preceding eNB serving the new cell, and an Iu or A interface corresponds to the preceding S1 interface. In this case, the RNC or BSC sends an Iu or A interface notification message, for example, a relocation complete message or another Iu or A interface message, to a core network device SGSN in the new cell. The SGSN sends an S3 interface message to the source MME to request the source eNB to release the S1 interface. A message that is sent to the new cell after the UE detects an RLF may be an RRC re-establishment message or a cell update message.

In this embodiment, the access network device eNB, RNC, or BSC in the new cell establishes a connection with the MME or the SGSN through the S1 interface message or the Iu or A interface message, thereby ensuring service continuity of the UE in an active state.

Embodiment 6

Figure 10:
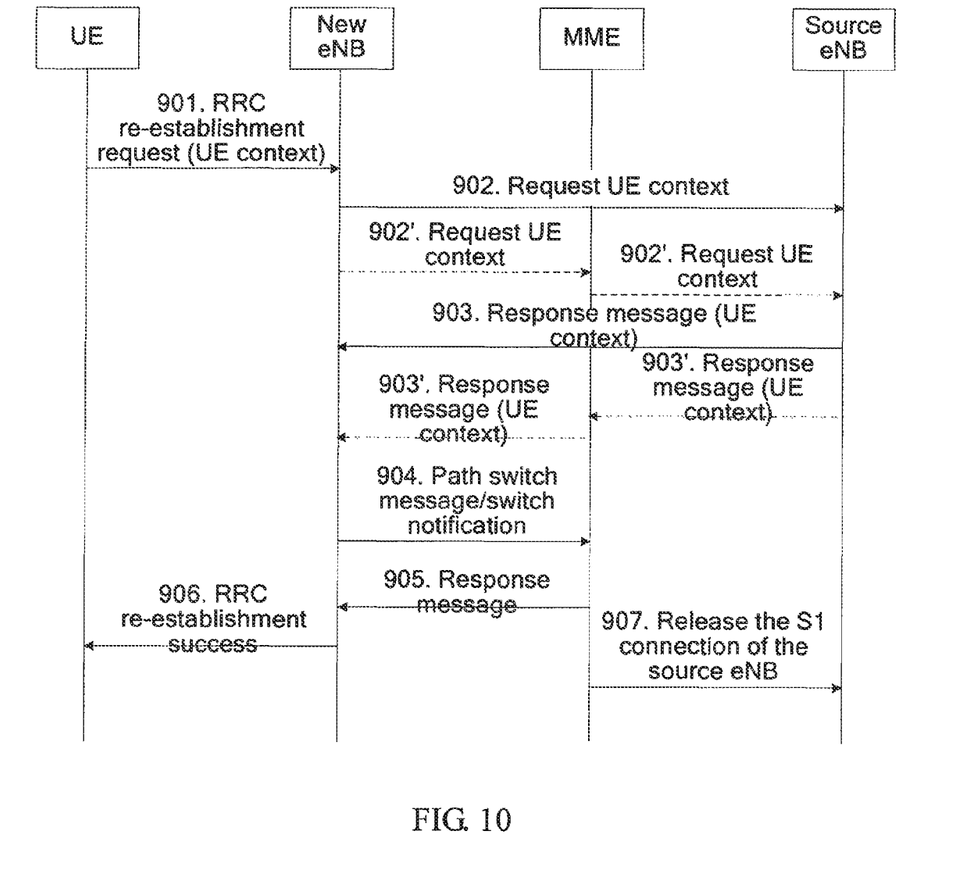
FIG. 10 is a schematic diagram of a service recovery process according to a six embodiment of the present invention.

This embodiment provides a service recovery method for a wireless communication network. In this embodiment, taking that a new cell is an LTE cell, an access network device in the new cell in this embodiment is an eNB serving the new cell, that is, a new eNB. As shown in FIG. 10, this method includes:

Step 901: A UE detects an RLF, reselects a new cell, and sends an RRC re-establishment request message to an eNB (a new eNB) in the new cell, where the message carries a UE identifier, such as an S-TMSI and an IMSI.

Step 902 or 902': The new eNB sends an X2 interface message to a source eNB or an S1 interface message to a core network MME to request UE context, where the message carries the UE identifier, such as the S-TMSI and the IMSI.

Step 903 or 903': After receiving the X2 interface message or the S1 interface message, the source eNB or the MME transfers the UE context to the new eNB according to the UE identifier, such as the S-TMSI and the IMSI.

Step 904: The new eNB sends an S1 interface message to request for establishing an S1 interface connection with the MME, where the S1 interface message may be a path switch message, a handover notify message, or another S1 interface message.

Step 905: The new eNB receives an S1 interface response message from the MME.

Step 906: The new eNB sends an RRC re-establishment success message to the UE.

If the new eNB does not receive the S1 interface response message from the MME in step 905, an RRC re-establishment failure message is sent to the UE in step 906.

Alternatively, after step 906, the method may further include:

Step 907: The MME sends an S1 interface release command to the source eNB to instruct the source eNB to release the S1 interface.

If the MME connected to the eNB serving the new cell is different from that connected to the source eNB, the two MMEs transfer a message through an S10 interface, and the source MME instructs the source eNB to release a connection of the S1 interface.

In step 902:

If the eNB (the new eNB) in the new cell does not know a running status of the eNB (the source eNB) in a source cell, and an X2 interface exists, an X2 interface request message may be sent first to request the source eNB to transfer the UE context, and a timer may be started at the same time. If the X2 interface does not receive a response message within a specified time period or receives a failure message, the new eNB sends an S1 interface request message to the MME to request the MME to transfer the UE context. The request message carriers the UE identifier, such as the S-TMSI and the IMSI.

If the MME connected to the eNB serving the new cell is different from that connected to the source eNB, that is, the new eNB is connected to a new MME, and the source eNB is connected to a source MME, the two MMEs transfer a message through the S10 interface, the new MME transfers a request message that includes the UE identifier, such as the S-TMSI and the IMSI, to the source MME through the S10 interface to request the source MME to transfer the UE context, or the source MME forwards the request message to the source eNB to request the source eNB to transfer the UE context.

If the new cell is a UMTS or GSM cell, an access network device RNC or BSC in the new cell corresponds to the preceding eNB in the new cell, and an Iu or A interface corresponds to the preceding S1 interface, the RNC or BSC sends an Iu or A interface request message to a core network device SGSN in the new cell. The SGSN sends the request message to the MME through an S3 interface to request the MME to transfer the UE context; or, after receiving the request message, the MME sends the request message to the eNB to request the eNB to send the UE context.

If the new cell is a UMTS or GSM cell, the Iu or A interface message, such as a relocation complete message and another Iu or A interface message, corresponds to the preceding path switch message, handover notify message, or another S1 interface message. In addition, a message that is sent to the new cell after the UE detects an RLF may be an RRC re-establishment message or a cell update message.

In this embodiment, the access network device in the new cell establishes a connection with the MME or the SGSN through the S1 interface message or the Iu or A interface message, thereby ensuring service continuity of the UE in an active state.

It may be understandable to those skilled in the art that all or part of the steps in the methods of the foregoing embodiments may be performed through relevant hardware instructed by a program. The program may be stored in a computer-readable storage medium such as a Read Only Memory (ROM), a Random Access Memory (RAM), a magnetic disk, and a Compact Disk-Read Only Memory (CD-ROM).

Embodiment 7

Figure 11:
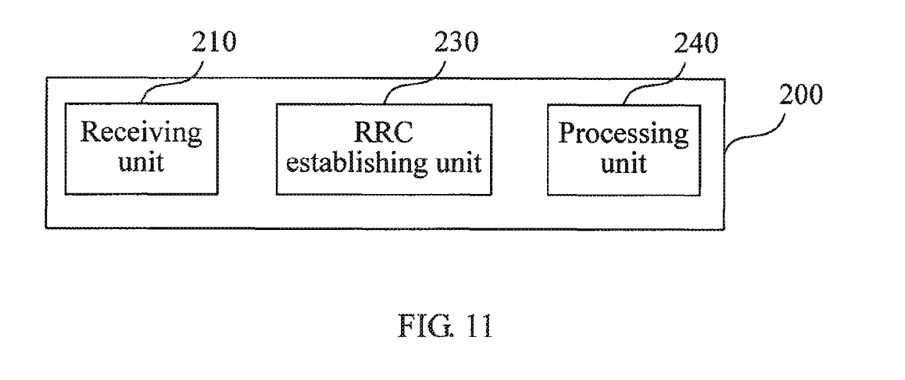
FIG. 11 is a structural block diagram of a first service recovery apparatus according to a seventh embodiment of the present invention.

This embodiment provides a service recovery apparatus 200 for a wireless communication network. As shown in FIG. 11, the apparatus includes: a receiving unit 210, an RRC establishing unit 230, and a processing unit 240. The receiving unit 210 receives an RRC re-establishment request or a cell update message from a UE; the RRC establishing unit 230 performs an RRC establishment process that is initiated by an NAS of the UE when the RRC re-establishment or the cell update fails; the processing unit 240 sends an initial UE message to a core network device when the RRC establishment process is complete.

Figure 12:
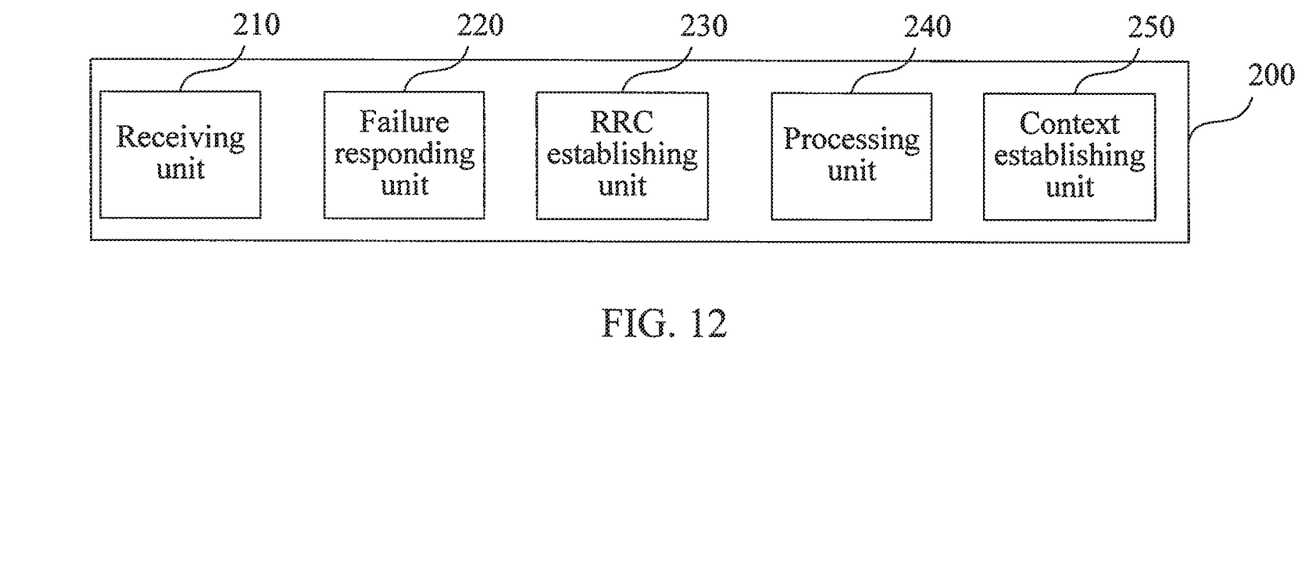
FIG. 12 is a structural block diagram of a second service recovery apparatus according to the seventh embodiment of the present invention.

In another embodiment of the present invention, as shown in FIG. 12, the preceding apparatus 200 may further include: a context establishing unit 250, configured to receive an initial context establishment request from the core network device, and send a context establishment response to the core network device. Alternatively, this apparatus may further include a failure responding unit 220, configured to send an RRC re-establishment failure message or a cell update failure message to the UE when the RRC re-establishment request or the cell update message does not carry context information of the UE.

Embodiment 8

Figure 13:
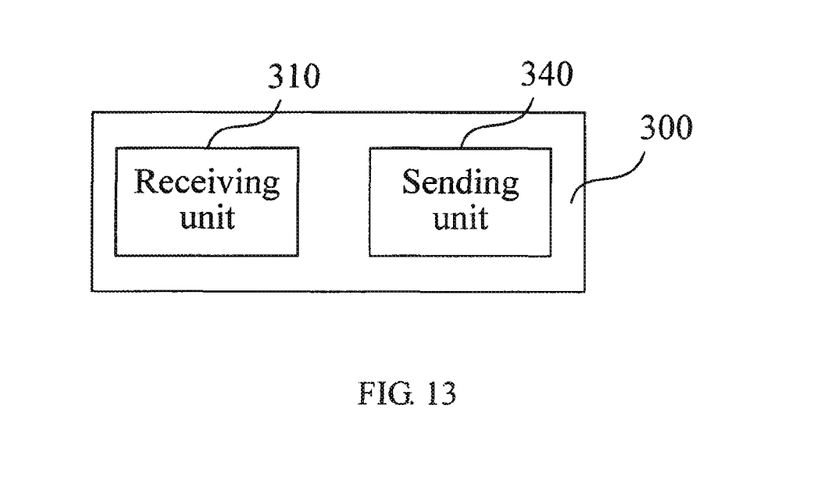
FIG. 13 is a structural block diagram of a first service recovery apparatus according to an eighth embodiment of the present invention.

This embodiment of the present invention provides a service recovery apparatus 300 for a wireless communication network. As shown in FIG. 13, this apparatus includes: a receiving unit 310 and a sending unit 340. The receiving unit 310 receives an RRC re-establishment request or a cell update message from a UE; and the sending unit 340 sends a notification message to a source access network device to request the source access network device to initiate a switching preparation process of an X2 and/or S1 interface when context information of the UE cannot be obtained.

Figure 14:
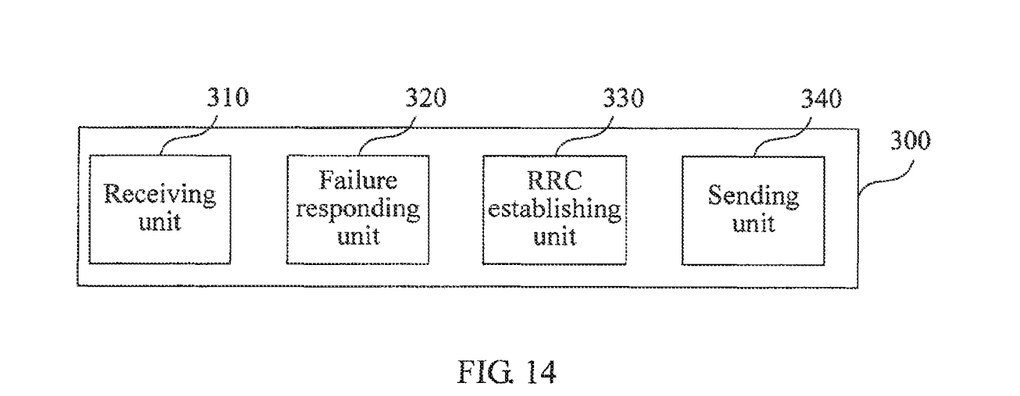
FIG. 14 is a structural block diagram of a second service recovery apparatus according to the eighth embodiment of the present invention.

In another embodiment of the present invention, as shown in FIG. 14, the apparatus 300 may further include: a failure responding unit 320 and an RRC establishing unit 330. The failure responding unit 320 sends an RRC re-establishment failure message or a cell update failure message to the UE when context information of the UE cannot be obtained; and the RRC establishing unit 330 performs an RRC establishment process that is initiated by an NAS of the UE.

Further, the sending unit 340 is further configured to send a notification message to the source access network device through an X2 interface; and send the notification message to a source core network device for the source core network device to forward the notification message to the source access network device when a notification response message fails to be received within a set time period or when a failure message is received; or the sending unit 340 is further configured to send the notification message to the source core network device for the source core network device to forward the notification message to the source access network device.

Embodiment 9

Figure 15:
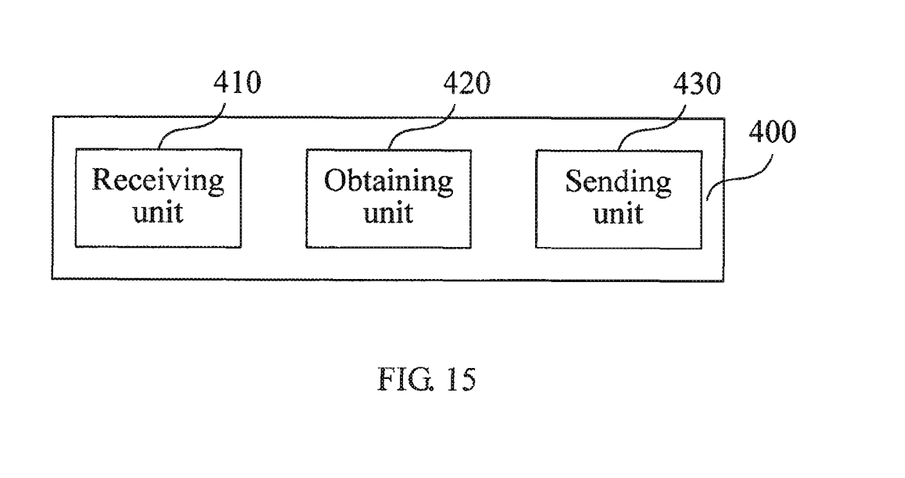
FIG. 15 is a structural block diagram of a service recovery apparatus according to a ninth embodiment of the present invention.

This embodiment provides a service recovery apparatus 400 for a wireless communication network. As shown in FIG. 15, this apparatus includes: a receiving unit 410, an obtaining unit 420, and a sending unit 430.

The receiving unit 410 receives an RRC re-establishment request or a cell update message from a UE, where the RRC re-establishment request or the cell update message carries context information of the UE and/or a UE identifier; the obtaining unit 420 obtains the context information of the UE; and the sending unit 430 sends a notification message to a core network device to request for establishing a connection with the core network device.

Specifically, the obtaining unit 420 is further configured to obtain the context information of the UE from the RRC re-establishment request or the cell update message when the RRC re-establishment request or the cell update message carries the context information of the UE; or, when the RRC re-establishment request or the cell update message does not carry the context information of the UE, send a request message to a source access network device or a source core network device to request the context information of the UE, where the request message carries the UE identifier.

Further specifically, when the RRC re-establishment request or the cell update message does not carry the context information of the UE, the obtaining unit 420 is further configured to send the request message to the source access network device through an X2 interface; and send the request message to the source core network device when a notification response message fails to be received within a set time period or a failure message is received.

In the preceding embodiment of the present invention, the service recovery apparatus for a wireless communication network may be an eNB in an LTE system, an RNC in a UMTS or a GSM system, or a BSC in the UMTS or the GSM system.

An embodiment of the present invention provides a service recovery system for a wireless communication network. The system may implement the service recovery methods for a wireless communication network in the first to sixth embodiments. The system includes the service recovery apparatus for a wireless communication network provided in the seventh, eighth, or ninth embodiment and a core network device.

The preceding embodiments further describe the purpose, technical solutions, and beneficial effects of the present invention. It can be understood that the protection scope of the present invention is not confined to the preceding embodiments of the present invention. The protection scope of the present invention is intended to cover all the modifications, equivalent replacements, and improvements provided that they fall in the scope of the idea and principles of the present invention.

What is claimed is:

1. A service recovery method for a wireless communication network, the method comprising:
   receiving, by a target base station, a radio resource control (RRC) re-establishment request from a user equipment (UE); and
   sending, by the target base station, an indication message indicating a radio link failure and corresponding to the received RRC re-establishment request to a source base station to trigger the source base station with self-determination to initiate a handover preparation procedure of an X2 interface between the source base station and the target base station wherein the UE remains in an active state.

2. The method according to claim 1, wherein, before sending the indication message to the source base station, the method further comprises:
   sending an RRC re-establishment failure message to the UE; and
   performing an RRC establishment process that is triggered by a non-access-stratum of the UE.

3. The method according to claim 2, wherein, in the RRC establishment process, an RRC message from the UE carries an indication or a cause value, wherein the indication or the cause value is configured to indicate that the RRC establishment process is a link recovery process triggered by the non-access-stratum.

4. The method according to claim 1, wherein, the sending the indication message to the source base station comprises:
   sending the indication message to the source base station through an X2 interface, and sending the indication message to a source mobility management entity (MME) for the source MME to forward the indication message to the source base station when an indication response message fails to be received within a set time period or a failure message is received; or
   sending the indication message to the source MME for the source MME to forward the indication message to the source base station.

5. An apparatus comprising:
   a receiver configured to receive a radio resource control (RRC) re-establishment request from a user equipment (UE); and
   a transmitter configured to send an indication message indicating a radio link failure and corresponding to the received RRC re-establishment request to a source base station to trigger the source base station with self-determination to initiate a handover preparation procedure of an X2 interface between the source base station and a target base station wherein the UE remains in an active state.

6. The apparatus according to claim 5, further comprising:
   a processor configured to:
   send an RRC re-establishment failure message to the UE when context information of the UE cannot be obtained; and perform an RRC establishment process that is initiated by a non-access-stratum of the UE.

7. The apparatus according to claim 5, wherein the transmitter is further configured to:
   send the indication message to the source base station through the X2 interface; and send the indication message to a source mobility management entity (MME) for the source MME to forward the indication message to the source base station when an indication response message fails to be received within a set time period or a failure message is received; or
   send the indication message to the source MME for the source MME to forward the indication message to the source base station.

8. A service recovery method for a wireless communication network, the method comprising:
   receiving, by a source base station, an indication message indicating a radio link failure sent from a target base station, the indication message corresponding to a radio resource control (RRC) re-establishment request from a user equipment (UE); and
   initiating with self-determination, by the source base station, a handover preparation procedure of an X2 interface between the source base station and the target base station triggered by the indication message, wherein the UE remains in an active state.

9. The method according to claim 8, further comprising:
   receiving, by the source base station, the indication message from a source mobility management entity (MME), the indication message being forwarded by the target base station.

10. An apparatus comprising:
    an receiver configured to receive an indication message indicating a radio link failure sent from a target base station, the indication message corresponding to a radio resource control (RRC) re-establishment request from a user equipment (UE); and
    a processor configured to initiate with self-determination a handover preparation procedure of an X2 interface between the apparatus and the target base station triggered by the indication message, wherein the UE remains in an active state.

11. The apparatus according to claim 10, wherein the receiver is configured to receive the indication message from a source mobility management entity (MME), the indication message being forwarded by the target base station.

* * * * *